United States Patent
Becker et al.

(10) Patent No.: US 7,814,840 B2
(45) Date of Patent: Oct. 19, 2010

(54) MAGNET ARRANGEMENT FOR A MAGNETIC LEVITATION VEHICLE

(75) Inventors: Peter Becker, Olching (DE); Quinghua Zheng, Taufkirchen (DE); Siegfried Ellmann, Aschheim (DE); Friedrich Loeser, Riemerling (DE)

(73) Assignee: ThyssenKrupp Transrapid GmbH, Kassel (DE)

( * ) Notice: Subject to any disclaimer, the term of this patent is extended or adjusted under 35 U.S.C. 154(b) by 304 days.

(21) Appl. No.: 10/592,828

(22) PCT Filed: Mar. 9, 2005

(86) PCT No.: PCT/DE2005/000406

§ 371 (c)(1),
(2), (4) Date: Sep. 14, 2006

(87) PCT Pub. No.: WO2005/090115

PCT Pub. Date: Sep. 29, 2005

(65) Prior Publication Data

US 2008/0252405 A1 Oct. 16, 2008

(30) Foreign Application Priority Data

Mar. 15, 2004 (DE) .................... 10 2004 012 748

(51) Int. Cl.
*B60L 13/04* (2006.01)
(52) U.S. Cl. .................. 104/281; 104/282; 104/283; 104/284; 104/285; 104/286
(58) Field of Classification Search ............ 104/281, 104/282, 283, 284, 285, 286
See application file for complete search history.

(56) References Cited

U.S. PATENT DOCUMENTS

| 4,698,895 | A | * | 10/1987 | Miller et al. ................ 29/464 |
| 5,467,718 | A | * | 11/1995 | Shibata et al. .............. 104/284 |
| 5,578,880 | A | * | 11/1996 | Lyons et al. ................ 310/90.5 |
| 6,357,359 | B1 | * | 3/2002 | Davey et al. ............... 104/282 |
| 6,568,332 | B1 | * | 5/2003 | Holzinger et al. ........... 104/281 |
| 6,601,519 | B1 | * | 8/2003 | Bindloss et al. ............. 104/284 |
| 6,827,022 | B2 | * | 12/2004 | van den Bergh et al. .... 104/284 |
| 2004/0123766 | A1 | * | 7/2004 | van den Bergh et al. .... 104/281 |
| 2006/0096495 | A1 | * | 5/2006 | Fischperer ................. 104/281 |
| 2006/0097116 | A1 | * | 5/2006 | Fischperer ................. 246/468 |

(Continued)

FOREIGN PATENT DOCUMENTS

DE 31 43 512 5/1983

(Continued)

OTHER PUBLICATIONS

Status of Transrapid Maglev, William W. Dickhart, Electro International, Apr. 18, 1991, pp. 613-617 (in eng.ish).

*Primary Examiner*—S. Joseph Morano
*Assistant Examiner*—Jason C Smith
(74) *Attorney, Agent, or Firm*—Michael J. Striker

(57) ABSTRACT

A magnet arrangement for a magnetic levitation vehicle is described. The magnet arrangement comprises a plurality of magnet poles (11) being combined to form groups (11a to 11f), wherein according to the invention each group contains one magnet pole (11a to 11f) or two magnet poles (11a to 11f). The windings (12a to 12f) of each group are controlled by a control circuit (18) individually assigned to it (FIG. 8).

3 Claims, 9 Drawing Sheets

U.S. PATENT DOCUMENTS

| | | | |
|---|---|---|---|
| 2006/0130699 A1* | 6/2006 | Thornton et al. | 104/284 |
| 2006/0219128 A1* | 10/2006 | Li | 104/284 |
| 2007/0095245 A1* | 5/2007 | Li | 104/284 |
| 2007/0131134 A1* | 6/2007 | Post | 104/284 |
| 2007/0169661 A1* | 7/2007 | Hahn et al. | 104/281 |
| 2007/0169662 A1* | 7/2007 | Ellmann et al. | 104/282 |
| 2008/0252405 A1* | 10/2008 | Becker et al. | 335/291 |

FOREIGN PATENT DOCUMENTS

| | | | |
|---|---|---|---|
| DE | 3143512 | * | 5/1983 |
| DE | 39 28 277 | | 12/1990 |
| EP | 0 580 107 | | 1/1994 |
| JP | 60223481 | | 7/1985 |
| WO | 97/30504 | | 8/1997 |

* cited by examiner

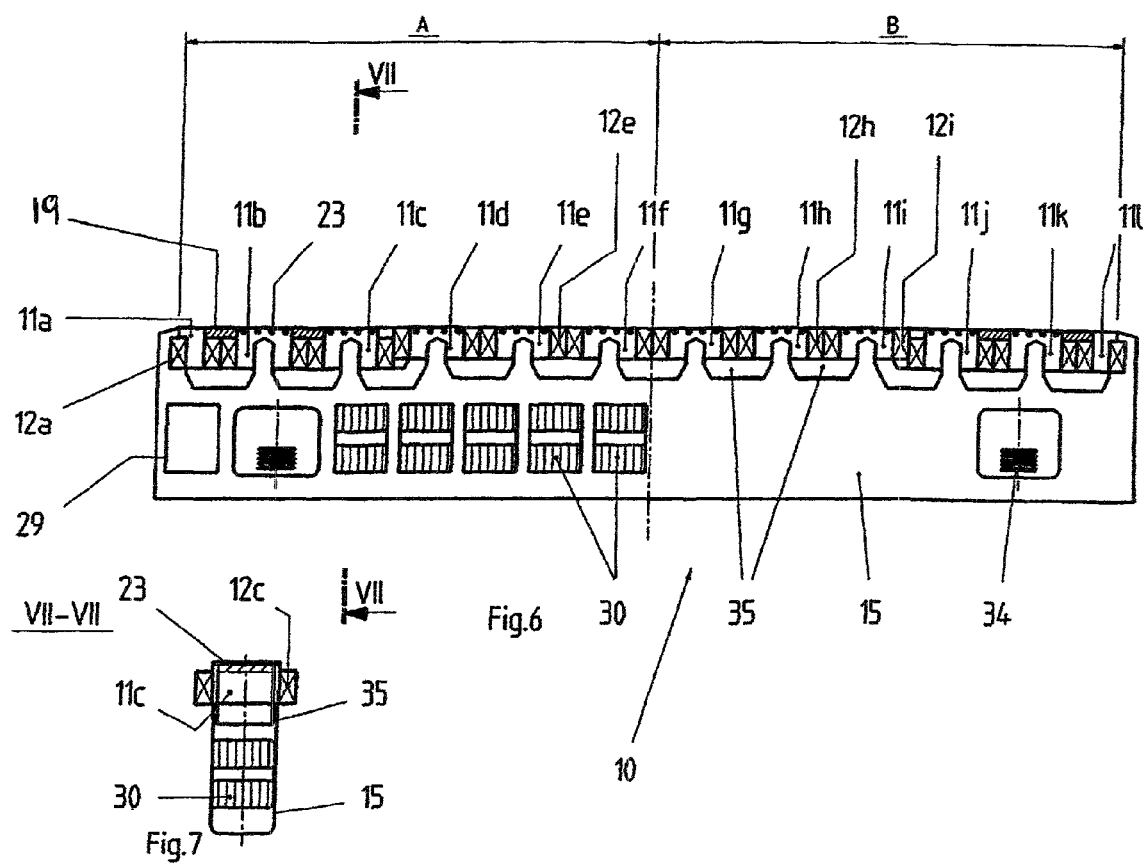

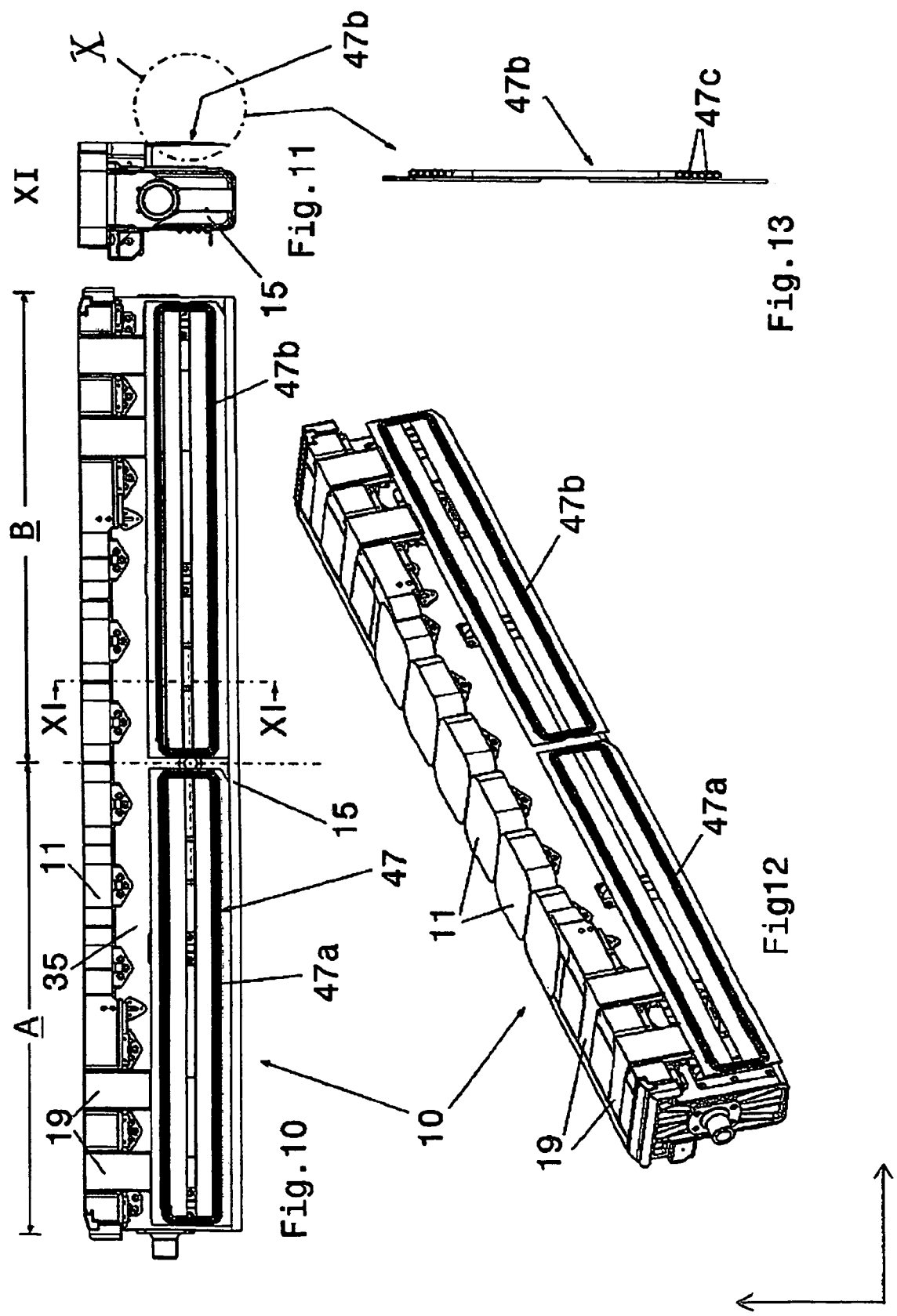

US 7,814,840 B2

MAGNET ARRANGEMENT FOR A MAGNETIC LEVITATION VEHICLE

The invention relates to a magnet arrangement of the species mentioned in the preamble of claim 1.

In a magnetic levitation vehicle, magnet arrangements of this type for example serve the functions of "carrying (supporting)" and/or "guiding". To this effect, they comprise a magnet back which is suspended via primary springs on support brackets which in turn are fastened to a levitation frame for a car body of the magnetic levitation vehicle. The mechanical setup is so chosen that two support brackets each are provided at the longitudinal ends of the levitation frames and fastened to different magnet arrangements. The magnet arrangements comprise twelve magnet poles which are divided into two groups comprising six magnet poles each, such that six magnet poles form a so-called half-magnet. The windings of the magnet poles of each group are supplied with electrical energy through a control circuit each so that the air gap between the magnet arrangement and the track is always constant during operation of the magnetic levitation vehicle.

Allocating the magnet poles to two groups serves for achieving sufficient redundancy. A failure of one half-magnet does not automatically entail a failure of the entire magnet arrangement. Instead a set-down of the car body onto the track can be prevented by a corresponding increase of the electrical current through the windings of an adjacent half-magnet. Such a control, however, bears two disadvantages.

A first disadvantage of a group-wise combination of six magnet poles 11 each is that comparatively high voltages may occur in the control circuits, the peaks of which may lie in a range of kilovolts as compared with operating voltages of e.g. 440 V. As the windings are usually made of line bands, parasitic capacities occur between the individual layers as well as between these and the cores which together with the inductivities of windings form electric oscillating circuits. If the magnet arrangement is excited, these oscillating circuits lead to resonance oscillations which entail the above mentioned substantial voltage excesses and might cause damage to the isolation in the windings that cannot be repaired. A second disadvantage is that the control circuits must be provided with special safety means which in case of a faulty behaviour of any actuator or its control will prevent the assigned group of magnet poles from hitting against the track.

Now, therefore, the technical problem to be solved by the present invention is to configure the magnet arrangement of the species mentioned above in such a manner that damage to isolation can be safely prevented and that there is no need for any safety facilities.

The characterizing features of claim 1 serve for solving this problem.

The invention bears the advantage that the control circuitry can be set-up in such a manner that the actuators are directly applied to the parasitic capacities, thus largely avoiding detrimental resonance oscillations. Another advantage is that a defective control circuit cannot entail any hitting of the pertinent magnet arrangement against the track, even if its actuator supplies the pertinent winding with the maximal possible electric current. Instead this is efficiently avoided by the action of the adjacent four or five magnet poles of the same group, whose control function in any case exceeds the failure behaviour of the defective magnet poles.

Other advantageous features of the present invention become evident from the sub-claims.

The invention is explained in greater detail hereinbelow by means of a preferred embodiment and based on the drawings enclosed hereto which have been prepared in different scales, wherein:

FIG. 1 schematically shows a partial section through a usual magnetic levitation vehicle in the area of a track provided with a long stator;

FIGS. 2 and 3 show a perspective view of a module with two magnet arrangements of a magnetic levitation vehicle pursuant to FIG. 1, viewed from the track side and from the outside, respectively;

FIG. 4 schematically shows a control loop for the magnet arrangements according to FIG. 2 and FIG. 3;

FIG. 6 shows a schematic front view of one of the magnet arrangements of FIG. 5 with further details;

FIG. 7 shows a section along line VII-VII of FIG. 6;

FIG. 10 shows the front view of a magnet arrangement with a pick-up coil for the contact-less power transmission, viewed from the side of a beam of the track;

FIG. 11 shows a section along line XI-XI of FIG. 10;

FIG. 12 shows a perspective front view of the magnet arrangement according to FIG. 10; and FIG. 13 shows an enlarged detail X of FIG. 11.

Figure 1:
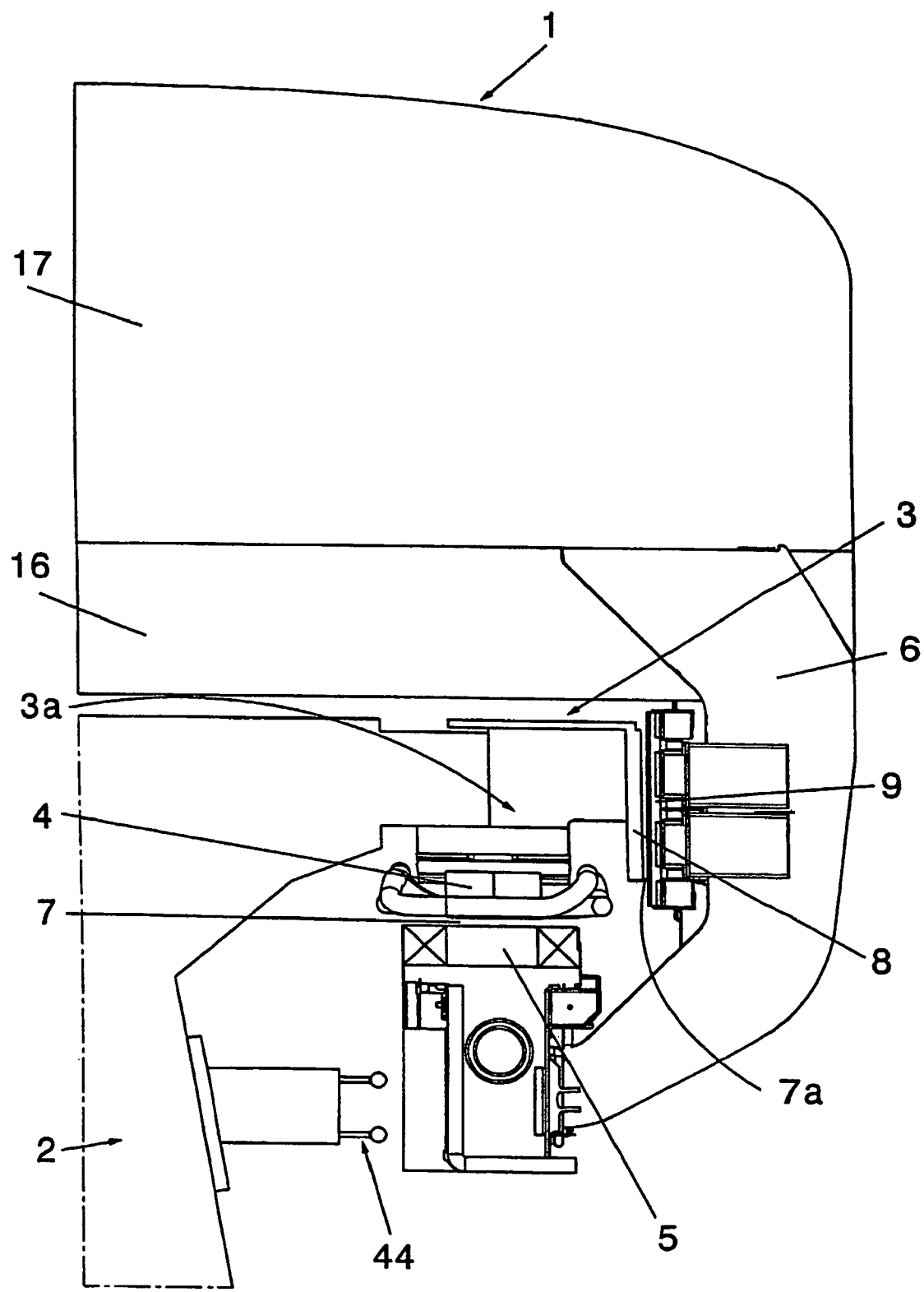

FIG. 1 schematically shows a cross-section through a magnetic levitation vehicle 1 which is conventionally movably mounted on a guideway extending in longitudinal direction of a route, said guideway being comprised of beams (supports) 2 made of steel and/or concrete as well as guideway plates 3 mounted on it. The propulsion of the magnetic levitation vehicle 1 is effected by a long stator motor which is comprised of stator packets 4 affixed underneath the guideway plates 3 and arranged one behind the other in their longitudinal direction. The stator packets 4 are comprised of alternatively succeeding teeth and grooves not shown here, with windings being inserted therein that are fed with three-phase current of a variable amplitude and frequency. The actual excitation field of the long stator motor is generated by at least one first magnet arrangement acting as support magnet 5 which is affixed by at least one lateral support bracket 6 to said magnetic levitation vehicle 1 and which is comprised of magnet poles facing the downwardly open grooves of the stator packets 4 as shown in FIG. 1. The support magnet 5 not only provides the excitation field, but also fulfils the function of carrying and levitation by maintaining a defined air gap 7 of e.g. 10 mm between said support magnet 5 and said stator packets 4 during operation of the magnetic levitation vehicle 1.

For the guidance of the magnetic levitation vehicle 1 the guideway plates 3 comprise laterally affixed guidance rails 8, which are faced by guidance magnets 9 also mounted to the support brackets 6 and serving for maintaining a gap 7a corresponding to gap 7 between itself and the guidance rail 8 during operation of the vehicle.

Figure 2:
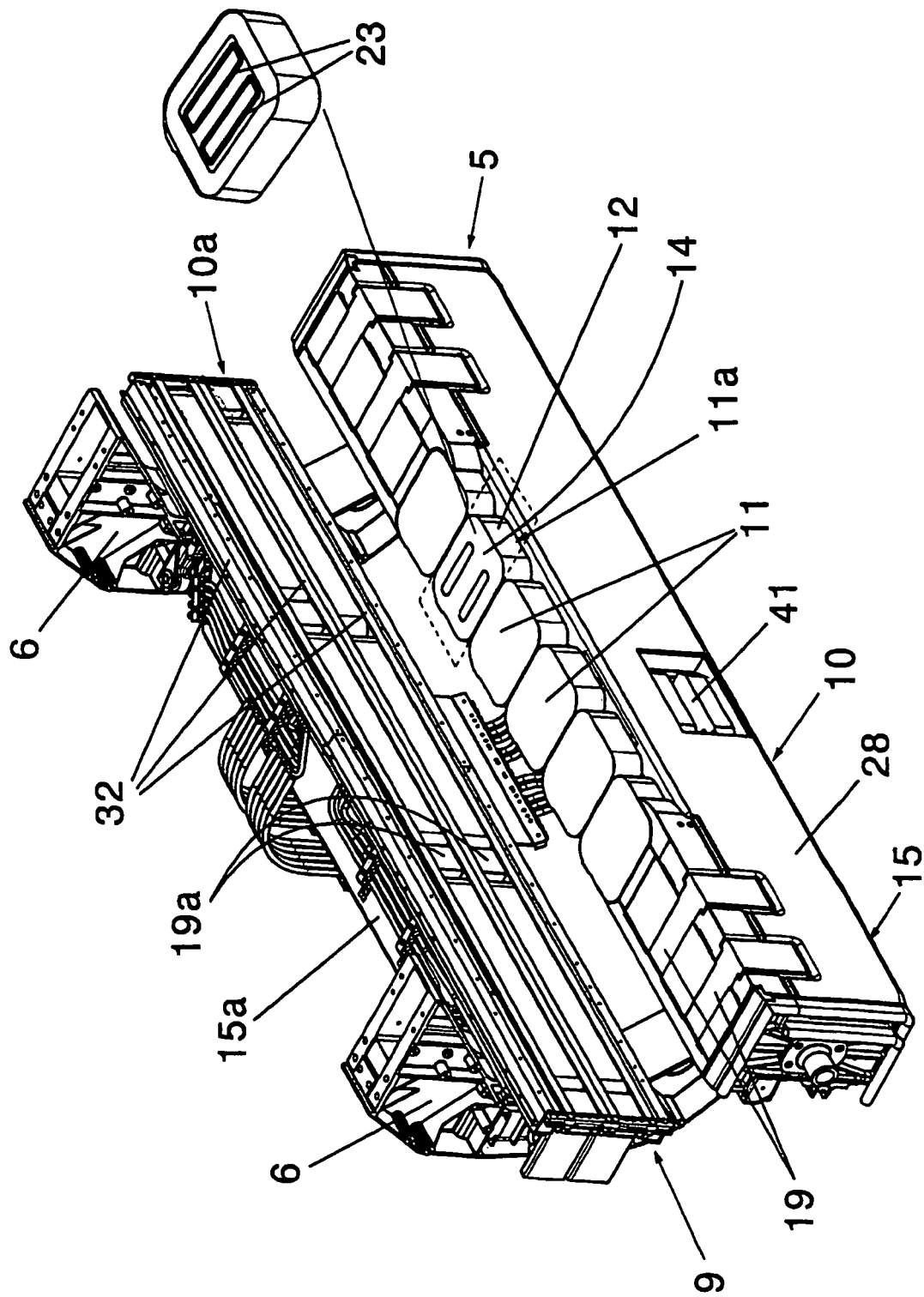
Figure 3:
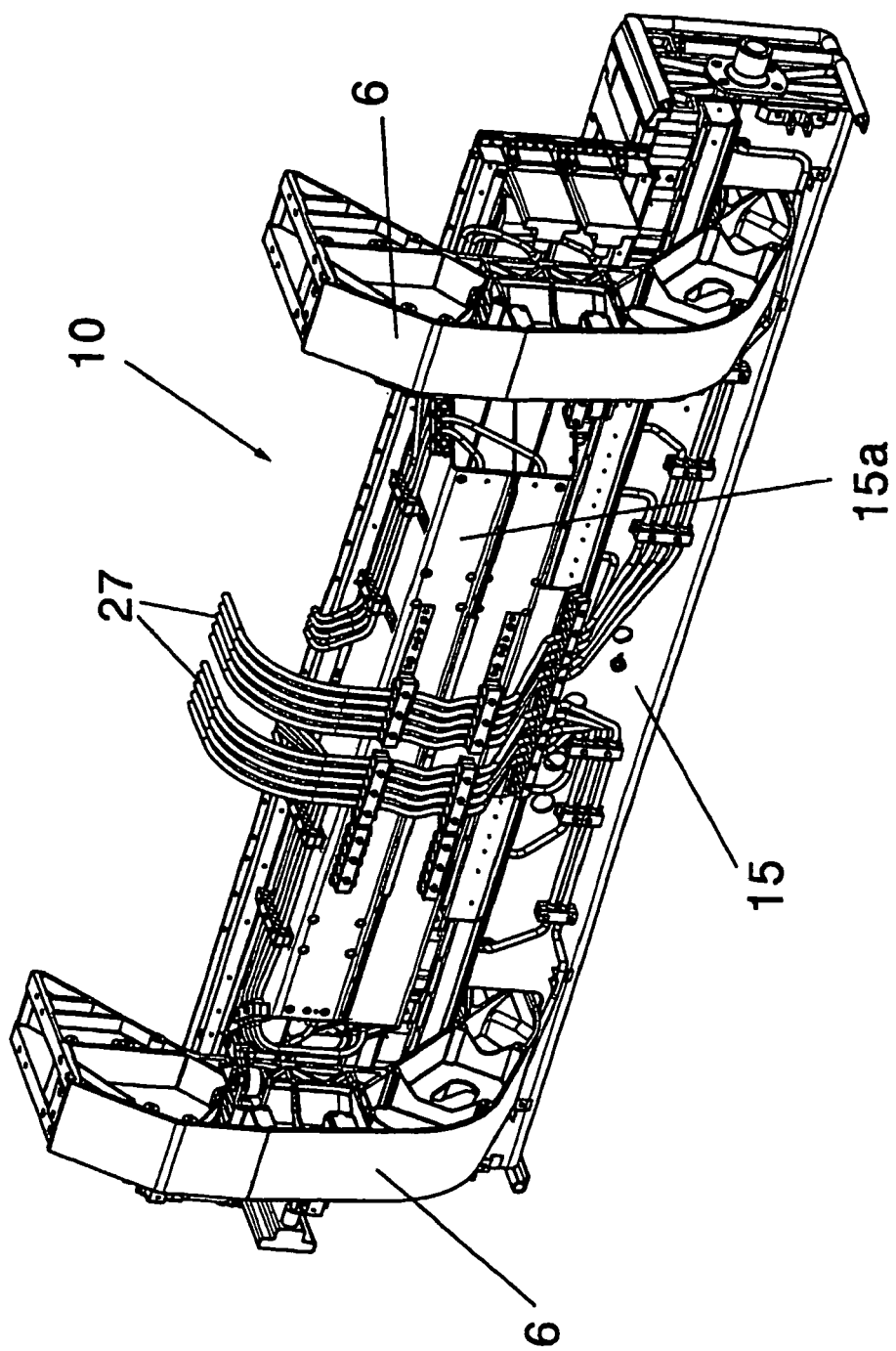

As shown on FIGS. 2 and 3, the support magnet 5 and the guidance magnet 9 shown in FIG. 1 form a module being affixed to the support brackets 6 and comprising a magnet arrangement 10, 10a for the functions of "supporting" (carrying) and "guiding". However, it is obvious that a plurality of such modules can be mounted at the magnetic levitation vehicle 1 in lateral arrangement side by side and one behind the other, viewed in the direction of travel.

The magnet arrangement 10 for the "carrying" function is comprised of twelve magnet poles 11 arranged one behind the other, whose windings 12 and cores 14, being schematically indicated in FIG. 2 for one of said magnet poles 11a, are electrically connected in series and are usually surrounded by a corrosion protection in form of a cast resin layer or the like. Said cores 14 of the individual magnet poles 11 are connected to each other by pole backs not shown and affixed by pole plates and rods penetrating through these pole plates, also not shown, to a means hereinafter called magnet back box 15 of the magnet arrangement 10. Engaging to this magnet back box 15 via primary springs are the support brackets 6 which are connected with a bend-proof understructure or suspension frame 16 FIG. 1) being comprised of longitudinal and transverse connectors and supporting a car body 17 of said magnetic levitation vehicle 1 equipped with a passenger cell.

Magnetic levitation vehicles 1 and their magnet arrangements are generally known to an expert, e.g. through printed publications U.S. Pat. No. 4,698,895, DE 39 28 277 A1, and PCT WO 97/30504 A1, which for sake of simplicity are made a part of the present disclosure by reference.

Figure 4:
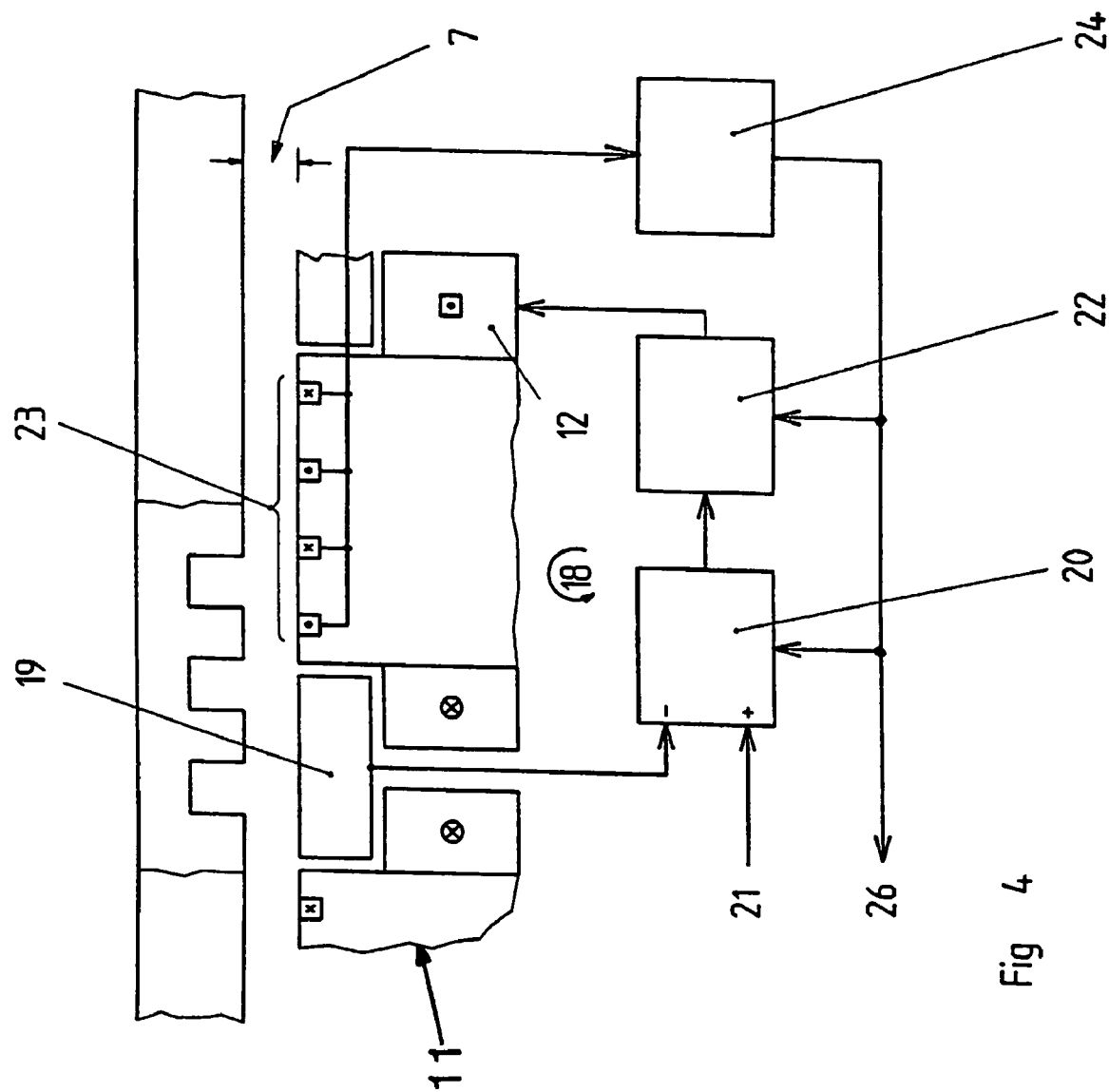

One control circuit 18 according to FIG. 4 serves for controlling the windings 12 of the magnet poles 11 to maintain the gap 7 constant during the ride of the magnetic levitation vehicle 1. This control circuit comprises at least one gap sensor, or preferably several gap sensors 19 (see also FIG. 2) which border the same plane as the magnet poles 11, which measure the actual size of the gap 7 by inductive or capacitive means and which serve as actual value transmitters for the control circuit 18. The electrical signals transmitted by gap sensors 19 are passed to a controller 20 and compared there with a nominal value fed by a line 21 and being fixedly preselected or adapted. Thereof, the controller 20 determines a differential or actuator signal for an actuator 22 which in turn controls the current through the windings 12 in such a manner that the gap 7 substantially takes a constant size and maintains it during the ride.

The required operating voltage for the control circuit 18 is supplied by a power supply unit shown in FIG. 4 and including windings 23 of a linear generator, said windings being mounted in at least one magnet pole, shown as an example in FIG. 2 in an enlarged detail of magnet pole 11a, and supplying in co-action with the long stator an alternate voltage of e.g. up to 300 V, depending on the speed of the magnetic levitation vehicle 1. This voltage is transformed in a voltage converter 24, having e.g. a step-up chopper, to a direct voltage of e.g. 440 V envisaged for operation, said voltage being fed to the controller 20 and the actuator 22 on the one hand and passed on through a line 26 to the on-board net of the magnetic levitation vehicle on the other hand.

While the controller 20, actuator 22 and the voltage transformer 24 have hitherto been placed anywhere, preferably in the floor of car body 17, thus calling for extensive cable routing as indicated by reference number 27 in FIG. 3, the present invention proposes to house these components entirely in the magnet back box 15 of the magnet arrangement 10. This results especially from FIG. 5, which shows a view of the magnet back box 15 upon removal of a covering 28 pointing to the track 2 (FIG. 2). Reference numerals 29 by example show openings in the magnet back box 15 which serve for accommodating drawer-like units 30 not illustrated in greater detail but indicated in FIG. 6 and FIG. 7 and housing the control circuit 18 and its components 20 and 22 as well as the voltage converters 24 of the power supply unit. Expediently the drawer-like units 30 are so configured that the correct contacts can be established when assembled without this requiring any further additional work, i.e. the openings 29 and the drawer-like units 30 are provided with co-acting plug-in and draw-out means or the like.

Accommodation of the control circuit 18 and the voltage converter 24 in the magnet back box 15 is possible without any problem, because the magnet back box 15 in known magnet arrangements 10 substantially consists of a hollow body with a U-profile, thus offering sufficient space. Thereby one can largely dispense with the cabling 27, because actually only the line 26 leading to the on-board net as well as any required lines for control and diagnostic purposes must be laid outside from the magnet back box 15. All the other lines can be laid within the magnet back box 15 and be laid from there on the shortest distance to the gap sensors 19 as well to as the windings 12 and 23. It follows therefrom that the entire magnet arrangement 10 including the magnet poles 11, the control circuit 18, the power supply unit 23, 24, and the cabling form an autonomous mechatronic module in which all the functions needed for the ability of levitation are integrated. If required, additional buffer batteries can be accommodated in the magnet back box 15 which in case of a standstill or a too slow ride of the magnetic levitation vehicle 1 supply the required energy.

Apart from the magnet arrangement 10 for the function of "carrying", the module shown in FIG. 2 has another magnet arrangement 10a with the magnet poles 32 for the function of "guiding". The magnet arrangement 10a is provided near a magnet back box 15a (FIG. 3) and expediently accommodated within the same raster length of e.g. 3096 mm which is also applicable to the magnet arrangement 10. By analogy to the gap sensors 19, other gap sensors 19a are assigned to the magnet poles 32 and connected to other control circuits not shown configured like the control circuits 18 and serving the purpose of keeping the gap 7a between magnet poles 32 and the lateral guidance rail 8 (FIG. 1) at a constant value. The same applies to the other control circuits, as has been described by way of the control circuits 18 hereinabove. The power to these control circuits is expediently supplied by the aid of the power supply units 23 and 24, because the guidance magnets normally have no windings of linear generators. In contrast with the magnet arrangement 10, there are only three magnet poles 32 existing in the magnet arrangement 10a which are formed by two rows of three windings each.

The magnet arrangement 10 destined for the function of "carrying" is comprised of twelve magnet poles 11 which are combined to form two groups of six magnet poles each lying immediately side by side. Each of these groups is controlled by one control circuit 18 each and expediently supplied with electric current by a power supply unit 23, 24 individually assigned to one group each. The advantage thus achieved on the one hand is that in case of a failure of one group, the other group keeps on working. On the other hand, in case of a failure of one group, the pertinent suspension frame 16 with its bend-proof longitudinal and transverse connectors is kept in its position by means of an assigned group of an adjacent magnet arrangement, without causing the magnetic levitation vehicle 1 to land on a gliding rail or without causing the magnet arrangement 10 to hit against the long stator. However, it also entails the two disadvantages outlined below.

A first disadvantage of a group-wise combination of six magnet poles 11 each is that comparably high voltages may occur in their windings 12. These are primarily caused by capacitive voltage excesses which result from the production of the windings of the magnet poles 11 from line bands and the parasitic capacities thus generated. The electrical oscillation circuits formed by the inductivities of the windings and the parasitic capacities lead to resonance oscillations which when the magnet arrangement 10 is excited, might entail so high voltages and electric currents that damage to isolation will occur. Another disadvantage is that the control circuits 18 have to be provided with special safety means which in case of a faulty working of an actuator 22 (FIG. 4) prevent the assigned group of magnet poles 11 from hitting against the long stator 11.

Figure 8:
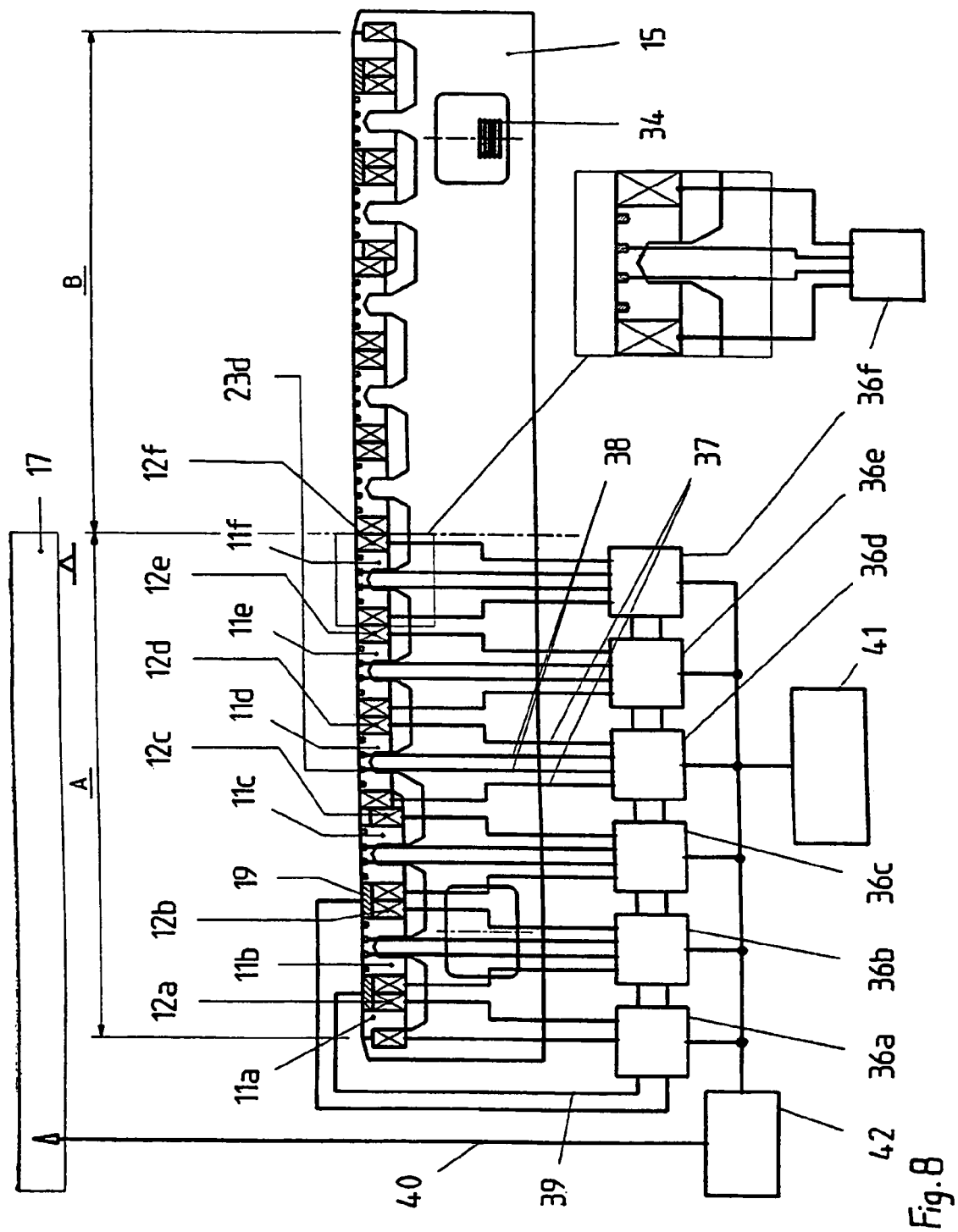
FIG. 8 shows a schematic circuit diagram for the magnet arrangement of FIG. 6 with the inventive individual activation of its magnet poles.

To avoid these disadvantages this invention proposes to provide each group only with one magnet pole 11 or maximally two magnet poles 11. Such an allocation of magnet poles 11 is shown on FIG. 6 to FIG. 8. The magnet arrangement 10 here contains twelve magnet poles 11a to 11l with windings 12a etc., only partly represented gap sensors 19 as well as windings 23 of the linear generator. Moreover, the magnet back box 15 and the drawer-like units 30, which contain the control circuits 18 and the power supply units, are indicated as in FIG. 2. The components contained in the drawer-like units 30 are shown in FIG. 8, however underneath the magnet back box 15 for the sake of a better understanding. Reference numerals 34 indicate recesses into which the ends of the support brackets 6 according to FIG. 1 and FIG. 2 enter. Furthermore, FIG. 6 shows the pole backs 35 not visible on FIG. 2, which connect the cores 14 of magnet poles 11 with each other. Finally, FIGS. 6 and 8 show that six magnet poles 11a to 11f or 11g to 11l each form one half-magnet A and B which are mechanically coupled in a known manner to the suspension frame 16 for the car body 17 (FIG. 1) of the magnetic levitation vehicle 1.

As shown in FIG. 8, the magnet poles 11 are electrically controlled individually and independently of each other. For this purpose, one of the magnet pole units 36a to 36f is assigned to each magnet pole 11a to 11f in the half-magnet A, each magnet pole unit containing an assigned control circuit 18 and an assigned voltage converter 24 provided with a step-up chopper or the like of the type as described above. Furthermore, each magnet pole winding 12 (e.g. especially a winding 12d of magnet pole 11d) is connected through lines 37 with an associated magnet unit (e.g. especially the magnet pole unit 36d) and the control circuit 18 contained therein and each linear generator winding 23 (e.g. especially a winding 23d of magnet pole 11d) is connected through lines 38 with the associated magnet pole unit 36d and the voltage converter 24 of FIG. 4 contained therein. The same applies in a same sense to all the other magnet poles 11, as is particularly shown by the enlarged representation of magnet pole 11f in FIG. 8. Moreover, the existing gap sensors 19 are connected via lines 39 with all magnet pole units 36 in order to transmit the relevant actual values of gap 7 to the control circuits 18 thereof. The other half-magnet B is configured accordingly.

On account of the described arrangement, each half-magnet A, B contains six magnet poles 11 with one assigned magnet pole unit 36 each. Therefore, if a magnet pole 11 or the pertinent magnet pole unit 36 becomes defective, there is no danger of an entire failure of the magnet pole arrangement 10 or of a half-magnet A, B, because the adjacent magnet poles of the defective unit can readily take-over their function. Therefore it is not required to provide the control circuits 18 with special security facilities against faulty controls of actuators 22, and there will be no occurrence of detrimental capacitive voltage excesses. Corresponding advantages will be obtained, if the magnet poles 11 are not activated individually, but in pairs. It is of special advantage that in case of a failure of any component, only one or maximally two magnet poles 11 will fail to work rather than six or twelve magnet poles 11 of a half-magnet or the entire magnet arrangement 10. Moreover, the voltage level is decreased, thus making it possible to reduce the voltage envisaged for the board net.

Besides, FIG. 8 also shows a special feature with regard to the magnet poles 11a and 11l, which form the beginning or the end of the magnet arrangement 10. As these magnet poles 11a, 11l are configured as half poles, thus leaving no space for the attachment of a linear generator winding 23, the pertinent magnet pole units 36a and 36l are expediently supplied with electrical current from the on-board net, as indicatively shown on FIG. 8 by a line 40.

The procedure to follow for the control of the magnet poles 32 of the guidance magnet is similar.

Generating on-board energy by the aid of linear generators works only in those track sections where the speed of the magnetic levitation vehicle 1 achieves a certain minimum rate. In other track sections, the electrical energy is therefore generated by the aid of electric contact rails mounted at the track and to which mechanical or mechanical-pneumatic current collectors 41 (FIG. 8) are assigned to. The current collectors 41 constitute integral parts of the power supply unit in addition to the windings 23 and are connected according to FIG. 8 to each individual magnet pole unit 36 if a single pole control is made. Moreover, the output of the current collector 41 leads through a suitable voltage converter 42, e.g. one that contains a step-up chopper, to the line 40. As shown on FIG. 2 and FIG. 5, the current collector 41 is integrated for example in the magnet back box 15 aerodynamically covered by the covering 28 and thus integrated into the autonomous module of the magnet pole arrangement 10 like the windings 23 of the linear generator.

Since contact rails and mechanical current collectors 41 are not always desired because of their propensity to wear and tear, particularly at high speeds, another essential feature of the invention provides for effecting the transmission of energy from the track 3 to the magnetic levitation vehicle 1 in a different manner, i.e. contact-less and preferably inductively. This is particularly shown in FIG. 9 which represents a schematic section substantially corresponding to FIG. 1, but at an enlarged scale.

Figure 9:
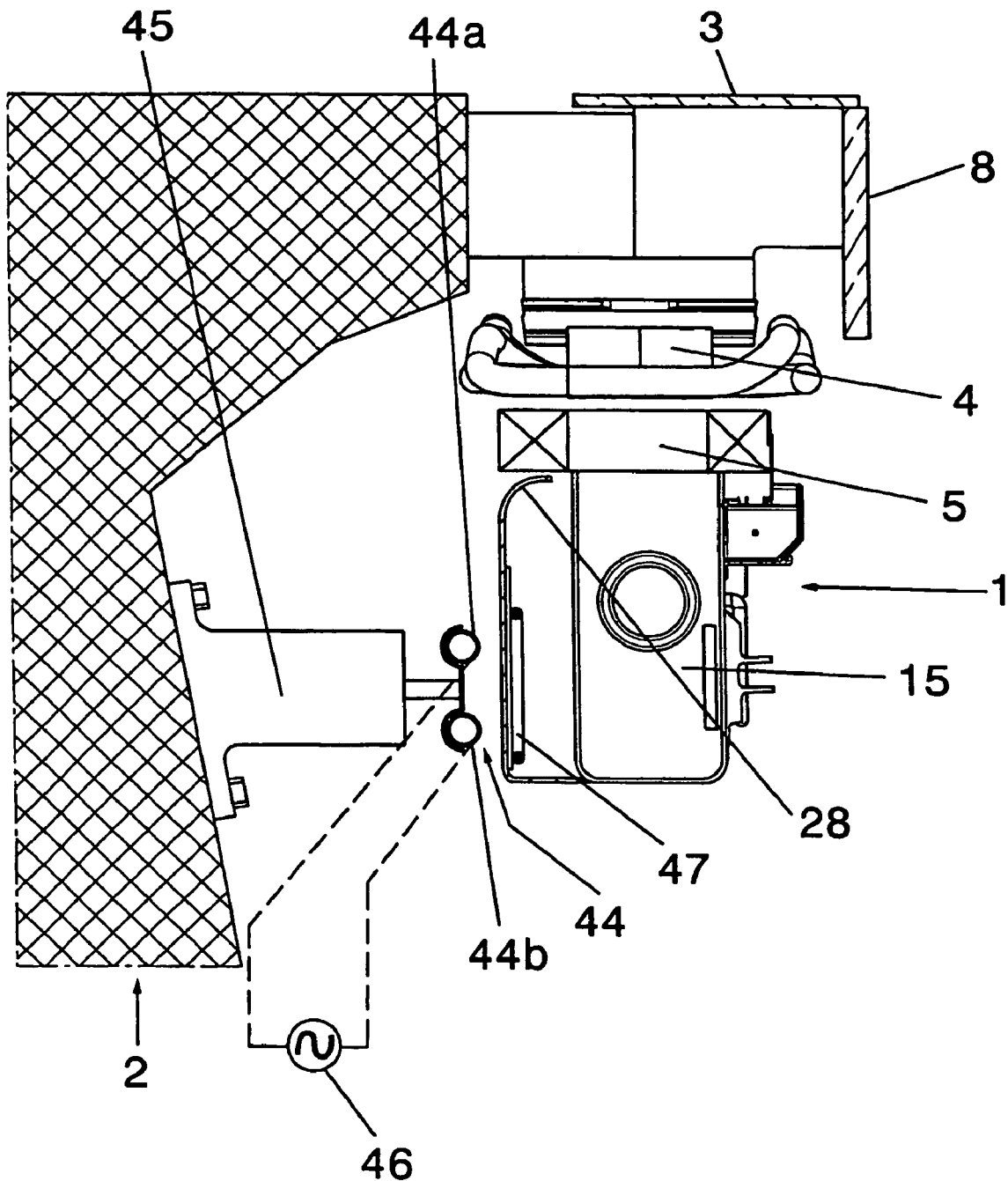
FIG. 9 shows a partial section similar to FIG. 1, but at a larger scale for illustrating a contact-less power transmission from the track to the magnetic levitation vehicle.

According to FIG. 9, at a point of the track where hitherto the current rail for the power collector 41 (FIG. 8) has been arranged, a primary conductor 44 configured as a transmitting coil is provided which preferably contains line sections 44a, 44b running to and fro and expediently extending over the entire length of the track 2, 3. The two line sections 44a, 44b are fastened to beam 2, e.g. by means of a holder 45 comprised of an isolator. The primary conductor 44 moreover is connected to at a preferably high-frequency voltage source 46 of 300 V, for example, which is only shown schematically.

Instead of the current collector 41, a receiver or pick-up coil 47 is mounted at the magnetic levitation vehicle 1. It is preferably so configured that it does not surround the primary conductor 44, but stands opposite to it at a small distance. Thus it is possible to house the pick-up coil 47 like the other described components of the control circuits 18 and the power supply units inventively in the magnet back box 15 and to cover it with the covering 18 comprised of an electrically isolating material.

According to a particularly preferred embodiment, the holder 45 is of such a hinged configuration that the primary conductor 44 is hingedly mounted and can be swiveled to the top or to the bottom at beam 2 and can be swung-off sectionwise. It can be avoided, therefore, that the primary conductor 44 must be fully dismounted during a work to which it poses an obstacle.

Figure 5:
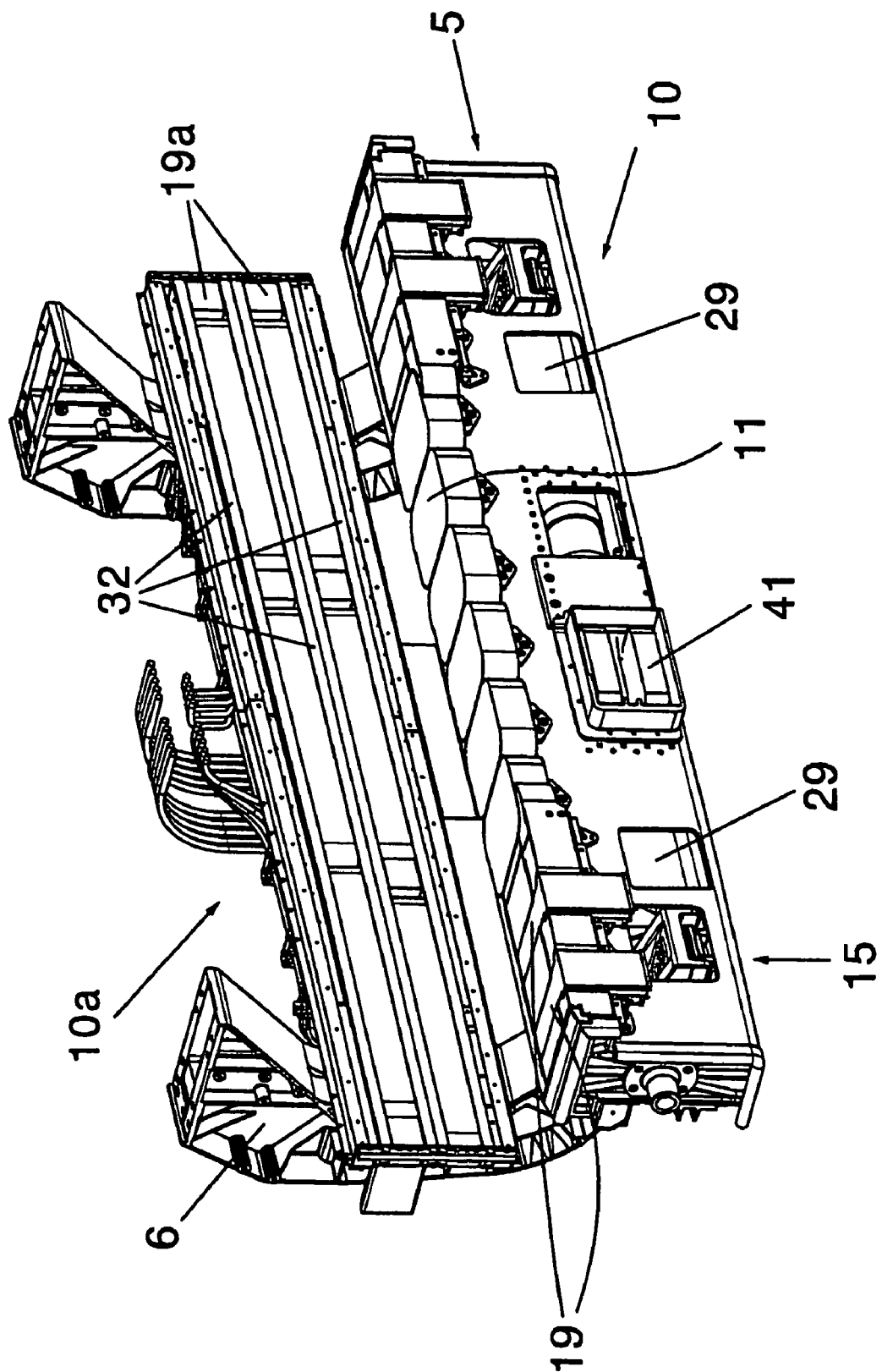
FIG. 5 shows a representation of the module corresponding to FIG. 3, but after removal of a front covering and with a view onto various components mounted in a magnet back box.

The configuration of the receiver coil 47 in shown in FIG. 10 to FIG. 13 in a representation similar to FIG. 5, and for reasons of redundancy the coil 47 expediently has two halves 47a and 47b that are assigned to one of the above described half-magnets A, B each and therefore have a length of approximately 1500 mm each in the embodiment. Each half 47a, 47b illustrated by a thick line in FIG. 10 and FIG. 12 preferably consists of a plurality of parallel conductors 47c (FIG. 13) that are relatively arranged to the primary conductor 44 so as to be penetrated by the concentric magnetic field lines generated by conductor 44 or line sections 44a, 44b respectively and so that the voltage of approximately 300 V supplied by the primary conductor 44 can be coupled out at its connection ends not shown. The two connection ends therefore can be connected to the magnet pole units 36 or voltage converter 42 analogously to FIG. 8. It is obvious that expediently appropriate primary conductors 44 are laid at both sides of the beam 2, if the magnetic levitation vehicle is provided with magnet arrangements 10, 10a at both longitudinal sides.

The receiver coil 47 is preferably manufactured as a prefabricated modular group together with the necessary contact elements, e.g. plug connectors, and so mounted at and/or integrated into the magnet back box 15 or covering 28 that it forms part of the autonomous module formed by the magnet arrangement 10.

An essential advantage of a contact-less transmission of power is that it works with mechanically poor wear and that the energy coupled out is independent of the travel speed as in case of applying a contact rail. Moreover, a multiple redundancy is obtained, because there are two coil halves 47a, 47b per magnet arrangement 10. Furthermore, the windings 23 of the linear generator and, if properly rated, even the step-up choppers and on-board batteries can be dispensed with. An emergency power supply, if required, could then be assured by simple lead batteries arranged on the track side.

The invention is not limited to the embodiments described hereinabove that can be modified in a plurality of ways. In particular, this applies to the total number of magnet arrangements 10, 10a existing per magnetic levitation vehicle and to the setup of modules from magnet arrangements 10, 10a for the design of support magnets, guidance magnets or combinations of support and guidance magnets. Furthermore, the number of magnet poles 11, 32 per support and guidance magnet can be chosen in a manner different from the one described. Finally, it is self-explanatory that the different features can also be applied in combinations other than those described and shown hereinabove.

The invention claimed is:

1. A magnet arrangement for a magnetic levitation vehicle comprising:
    a plurality of at least three magnet poles (11) arranged one behind the other and each having a core (14) and a winding (12), wherein said plurality of at least three magnet poles (11) is divided into a number of at least two groups, wherein each group contains only either one magnet pole (11) or two magnet poles (11) and wherein each group of the at least two groups is arranged one behind the other;
    a number of at least two control circuits (18) corresponding to the number of at least two groups, wherein each of said control circuits (18) is assigned to a respective one of said at least two groups and is arranged for controlling an electrical current flowing through the windings (12) of the at least two group's only either one or two magnet poles (11); and
    a number of at least two power supply units corresponding to the number of at least two groups, wherein each individual power supply unit of the number of at least two power supply units supplies power to each individual corresponding group of only either one or two magnet poles (11), and wherein each individual power supply unit comprises linear generator windings (23) and is embodied in each of said only either one or two magnet poles (11) of each respective individual corresponding group;
    wherein each separate power supply unit of the number of at least two power supply units is included in each separate control circuit of each of said number of at least two control circuits (18) assigned to a respective one of said at least two groups, and
    wherein each separate one of said number of at least two power supply units for each respective group of only either one or two magnet poles (11) includes at least one separate voltage converter (24) connected to said power supply unit's linear generator windings (23).

2. A magnet arrangement according to claim 1, characterized in that the control circuits (18) and power supply units (23, 24, 47) are housed in a magnet back (15) of the magnet arrangement (10).

3. A magnetic levitation vehicle having a plurality of magnet arrangements, each magnet arrangement comprising:
    a plurality of at least three magnet poles (11) arranged one behind the other and each having a core (14) and a winding (12), wherein said plurality of at least three magnet poles (11) is divided into a number of at least two groups, wherein each group contains only either one magnet pole (11) or two magnet poles (11) and wherein each group of the at least two groups is arranged one behind the other;
    a number of at least two control circuits (18) corresponding to the number of at least two groups, wherein each of said at least two control circuits (18) is assigned to a respective one of said at least two groups and is arranged for controlling an electrical current flowing through the windings (12) of the group's only either one or two magnet poles (11); and
    a number of at least two power supply units corresponding to the number of at least two groups, wherein each individual power supply unit of the number of at least two power supply units supplies power to each individual corresponding group of only either one or two magnet poles (11), and wherein each individual power supply unit comprises linear generator windings (23) and is embodied in each of said only either one or two magnet poles (11) of each respective individual corresponding group;
    wherein each separate power supply unit of the number of at least two power supply units is connected to a separate one of said number of at least two control circuits (18), and
    wherein each separate one of said number of at least two power supply units for each respective group of only either one or two magnet poles (11) includes at least one separate voltage converter (24) connected to said power supply unit's linear generator windings (23).

* * * * *